(No Model.)
S. P. GREY.
CIRCULAR SAW.
No. 411,189. Patented Sept. 17, 1889.
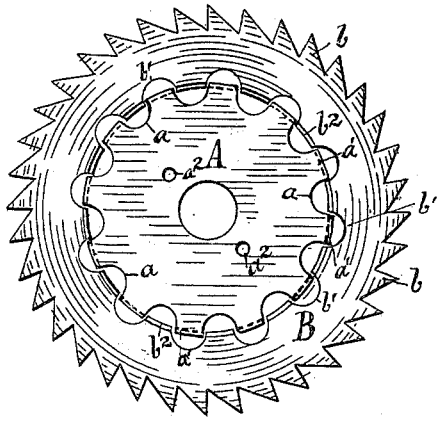
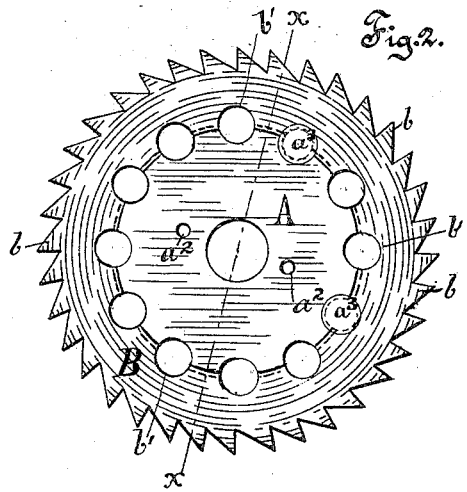
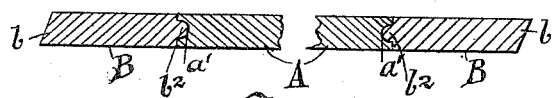
Witnesses:
Edw. E. Clement
Chas. F. Benjamin
Inventor:
Sylvester P. Grey,
By J. L. McFarland,
His Attorney.

UNITED STATES PATENT OFFICE.

SYLVESTER P. GREY, OF NASHVILLE, TENNESSEE.

CIRCULAR SAW.

SPECIFICATION forming part of Letters Patent No. 411,189, dated September 17, 1889.

Application filed August 18, 1888. Renewed June 27, 1889. Serial No. 315,721. (No model.)

*To all whom it may concern:*

Be it known that I, SYLVESTER P. GREY, a citizen of the United States, residing at Nashville, in the county of Davidson and State of Tennessee, have invented certain new and useful Improvements in Circular Saws; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of circular saws having a detachable tooth-section; and its object is to enable the set of teeth of such a saw to be renewed or the diameter of the saw changed, at pleasure.

In the accompanying drawings, wherein like letters represent like parts, Figure 1 is a side elevation showing the templet and tooth-section detached and in position to be either united or taken out of plane. Fig. 2 is a side elevation showing the sections united and securely fastened; and Fig. 3 is a cross-section on the designated line of the next preceding figure, showing the method of uniting the sections.

A is the templet of a circular saw, having scallops $a$ $a$ formed in the circumference thereof, as shown in Fig. 1, and grooves $a'$ $a'$ formed in the edges of the radial projections constituted by the scalloping described, as shown in Fig. 3.

B is a flat ring, constituting the tooth-section of the saw, and has ordinary teeth $b$ $b$ formed in the circumference thereof. Around the inner edge are formed scallops $b'$ $b'$ corresponding in size and contour to those in the templet, as shown in Fig. 1. Tenons $b^2$ $b^2$ (shown in Fig. 1) are formed concentrically between every two scallops of a size and form to fit the grooves $a'$ of the templet, as shown in Fig. 3, it being understood that none of the figures of the drawings are drawn to scale, it being only necessary to indicate form and arrangement by said drawings.

To unite the templet and the tooth-section, the latter may be placed in a vise and the former brought into plane therewith by letting the tenons $b^2$ enter the scallops $a$, as shown in Fig. 1. By inserting lever-bars in orifices $a^2$ of the templet the latter may be turned to the right or left till the tenons are clamped in the grooves $a'$, as shown in Figs. 2 and 3, and the scallops of both parts being in correspondence and forming a circle of round orifices, the two plates or sections may be secured together by flush rivets $a^3$, placed in as many of the scallop-orifices as are deemed necessary, as shown in Fig. 2.

Having thus fully described my invention, I claim—

The combination, in a circular saw, of the templet A, having the scallops $a$ and the grooves $a'$, with the ring B, having the teeth $b$, the scallops $b'$, and the tenons $b^2$, the said scallops $a$ and the said tenons $b^2$ being so constructed that the said tenons can be passed through the said scallops $a$, when the ring B is placed upon or removed from the templet A, for the purpose of renewing, altering, or replacing the tooth-section of the saw without removal or renewal of the templet.

In testimony whereof I affix my signature in presence of two witnesses.

SYLVESTER P. GREY.

Witnesses:
A. W. WILLS,
J. W. HICKMAN.